Nov. 20, 1951  L. A. WILLIAMSON, JR., ET AL  2,575,541
AIRPLANE CABIN COOLING SYSTEM
Filed June 26, 1948
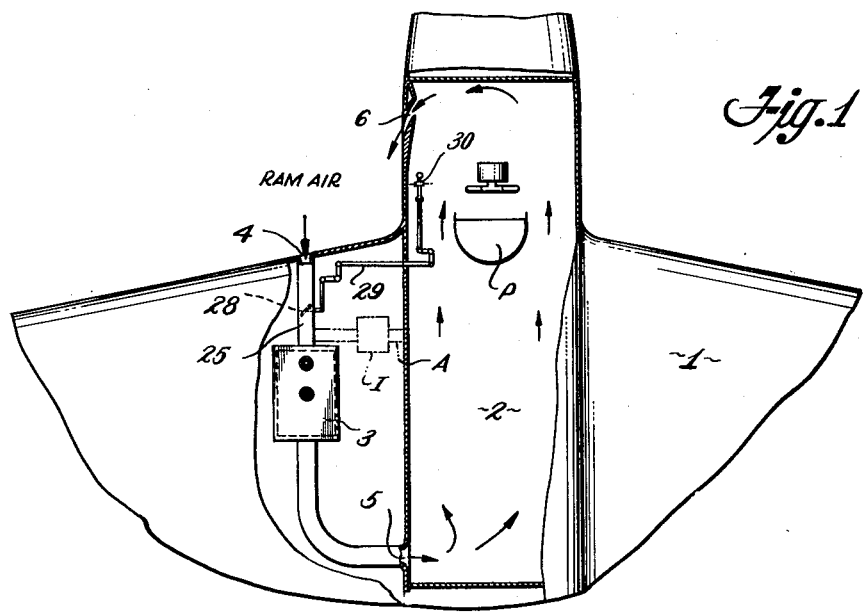
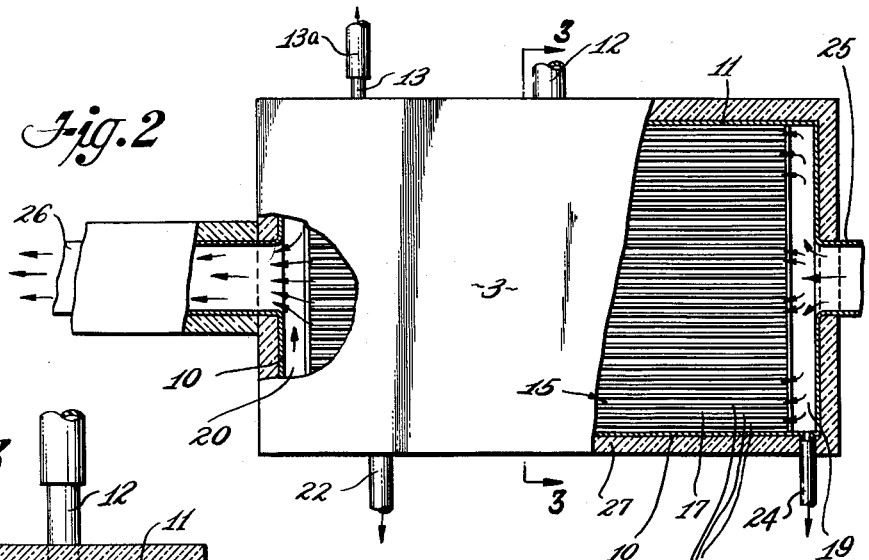
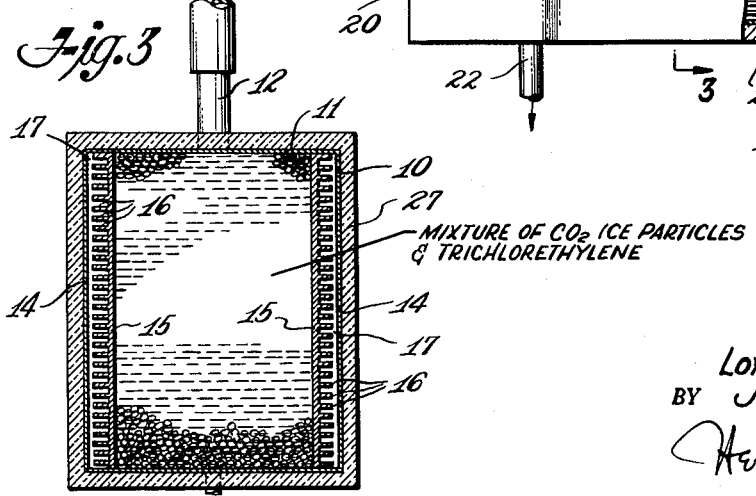
MIXTURE OF $CO_2$ ICE PARTICLES
& TRICHLORETHYLENE
INVENTORS
LOYAL A. WILLIAMSON JR.
BY JOE LEMUEL BYRNE
Herbert E. Metcalf
Attorney Patented Nov. 20, 1951

2,575,541

UNITED STATES PATENT OFFICE 2,575,541

AIRPLANE CABIN COOLING SYSTEM

Loyal A. Williamson, Jr., Los Angeles, and Joe Lemuel Byrne, Gardena, Calif., assignors to Northrop Aircraft, Inc., Hawthorne, Calif., a corporation of California Application June 26, 1948, Serial No. 35,387

1 Claim. (Cl. 62—91.5)

The present invention relates to air coolers and, more particularly, to a cooler particularly adapted to cool the cabins of high speed airplanes.

In high speed aircraft, particularly in experimental airplanes whose velocities approach the speed of sound, the skin friction at high speeds can produce high cabin temperatures, on the order of 175° F. and over. For example, in one particular airplane configuration, at about 650 M. P. H., the boundary layer over the airplane, with the ambient air at 100° F., will be at a temperature of about 165° F. If ram air is directly circulated through the cabin, the ram effect still further raises the temperature therein to about 175° F. Thus, it is not possible at high speeds to maintain an airplane cabin even at ambient air temperatures, by the use of ram air taken in during flight of the airplane. Greenhouse effect raises the temperature of the cabin still further when the sun is shining on the pilot's canopy in flight. Consequently, some cockpit cooling means are required, in order that the pilot may be reasonably comfortable. Mechanical refrigeration systems, however, are heavy, take up space and consume power that can well be used for other purposes.

It is an object of the present invention to provide a means and method of cooling the cabin of an airplane by the efficient use of $CO_2$ ice in a device of minimum weight and space.

One of the main problems involved in the use of $CO_2$ ice in heat exchangers is that of obtaining a good heat conducting contact between the $CO_2$ ice and the walls of the heat exchangers. This problem can be solved by immersing the $CO_2$ ice in a liquid that is fluid at solid $CO_2$ temperatures, and we are aware that $CO_2$ ice has heretofore been contacted with alcohol and light petroleums in heat exchanging structures. Users of such mixtures have depended on the presence of the $CO_2$ gas evolved during the evaporation of the Dry Ice to maintain the alcohol or petroleum in a fireproof condition. However, after the Dry Ice has evaporated no such protection exists, and a definite fire hazard would exist if such liquids were to be utilized in airplane heat exchangers.

It is another object of the present invention to provide a mixture of $CO_2$ ice and a liquid that is non-inflammable, for use as a refrigerant in a heat exchanger particularly adapted for airplane use.

In broad terms, the invention comprises a small, compact heat exchanger containing $CO_2$ ice and trichlorethylene ($C_2HCl_3$), preferably with the $CO_2$ ice in chips or granules totally immersed in the liquid to form a thick, soupy, but pourable mixture. Air, preferably generated by the ram pressure of the airplane in flight, is then circulated through the heat exchanger in contact with the walls thereof that are cooled by the mixture, and the cooled air is utilized at extremely low temperature to cool the cockpit of the airplane by mixing with the hot air therein. Excellent heat conductivity is provided by the liquid for the most efficient use of the $CO_2$ ice, and after the solid $CO_2$ has evaporated, the remaining liquid is non-inflammable and non-explosive.

One of the main advantages of such a system is that a large quantity of heat can be absorbed rapidly, so that a maximum cooling effect can be obtained for a short period of time with a minimum system weight and space. Present day airplanes capable of approaching the speed of sound are usually provided with propulsion engines of extremely high power and of relatively high fuel consumption, so that flights are relatively short, on the order of one-half hour for example. Consequently, a $CO_2$ ice system in which heat is absorbed as fast as possible becomes practical for cooling the cabin of such airplanes during flight.

Our invention may be more fully understood by reference to the drawings wherein:

Figure 1 is a diagram showing an air circulation path for the present invention as used in a high speed airplane.

Figure 2 is a cross-sectional view of a preferred heat exchanger embodying the present invention.

Figure 3 is a longitudinal sectional view taken as indicated by line 3—3 in Figure 2.

Referring first to Figure 1, an airplane 1 is provided with a pilot's cabin 2 that is to be cooled. A heat exchanger 3 is provided, receiving ram air from air intake 4 and discharging cooled air into cabin 2 through cabin air inlet 5. Air is vented from cabin 2 through air outlet 6.

The detailed construction of heat exchanger 3 is shown in Figures 2 and 3. A welded casing 10 is provided, having a top plate 11 carrying a filler tube 12 leading to an outside loading opening (not shown) and a $CO_2$ gas outlet 13. Gas outlet 13 is fitted with a vent tube 13a venting $CO_2$ gas from inside the heat exchanger to the atmosphere at a skin region of ambient static pressure.

Sides 14 of the heat exchanger are provided with inner heat exchanging liners 15 having a plurality of integral longitudinal ribs 16 projecting outwardly, but terminating short of sides 14. The space between the individual ribs 16 and the space between the ends of ribs 16 and the sides 14 constitute side air ducts 17 through which the ram air is passed. These ducts 17 are connected at one end of the heat exchanger by intake manifold 19 connected to ram and at the other end by an outlet manifold 20, each of these manifolds extending entirely across the end of the heat exchanger.

The inner space of the heat exchanger 3 as defined by the liners 15 and manifolds 19 and 20 is provided with a refrigerant drain 22. One manifold is provided with a drain outlet 24, to drain water resulting from the melting of frost developed in the air ducts and manifolds during use. Both drains are normally closed. The inlet manifold 19 is connected to ram air inlet 4 by inlet pipe 25, and the outlet manifold 20 is connected to cabin air inlet 5 by outlet pipe 26.

The refrigerant used in the heat exchanger is a soupy mixture of trichlorethylene and $CO_2$ ice in chipped or granular form, and is easily poured into the heat exchanger through filler tube 12, which in the presently described device need only be 1½" in diameter. A maximum of $CO_2$ ice chips is preferably used, with just sufficient trichlorethylene to fill the spaces between and cover the $CO_2$ ice particles. This mixture will pour readily at $-110°$ F. The size of the heat exchanger and thus the quantity of refrigerant used will of course depend on the length of the flights to be made by the airplane, the ambient temperature, the size of the cabin to be cooled, number of people in the cabin, and other factors, such as electrical machinery, dissipating heat into the cabin.

The entire heat exchanger and the outlet thereof is provided with a layer of insulation 27, and the amount of ram air admitted to the heat exchanger is controlled by a valve 28 connected by a lever linkage 29 for example, to a valve operating handle 30 in the cabin 2 close to the pilot's seat, the latter being indicated by line P. If desired, however, valve 28 can be operated automatically by a cabin thermostat in conjunction with an electric or hydraulic actuator. Furthermore, the efficiency of the installation may be further increased by installing a cabin recirculating line utilizing a fan or pump I to recirculate a portion of the cooled cabin air through the heat exchanger as indicated by flow path A. This procedure results in lessening the heat load on the heat exchanger as a quantity of cool air from the cabin is mixed with a quantity of hot ram air at the heat exchanger inlet, thereby reducing the heat exchanger inlet temperature below ram temperature. From a standpoint of minimum weight and simplicity, however, the use of all ram air, manually controlled, is preferred.

In one particular installation found suitable for ram cooling a 30 cubic foot cabin of an airplane operating at speeds above 600 M. P. H., two heat exchangers as described are utilized, weighing 9 pounds each, fabricated from magnesium by welding. Each heat exchanger is charged with a mixture of 8½ pounds of Dry Ice in 6 pounds of trichlorethylene with a $CO_2$ particle size sufficiently small to form a pourable mixture when combined with trichlorethylene. In any event, an initial charge of at least 50% by weight of the $CO_2$ in 50% trichlorethylene is preferred. This refrigerant assumes an average temperature of about $-110°$ F.

Utilizing ram air only, with about 1.4 pounds of air flowing per minute, the output air temperature from the heat exchanger into the cabin in this particular system remains substantially constant at $-70°$ F., which flow, when mixed with cabin air, will maintain the cabin at $+70°$ F. in a 100° F. ambient air temperature for about 20 minutes at 650 M. P. H. Thereafter the airflow is gradually increased, as the Dry Ice is used up, to about 9 pounds per minute, which procedure will maintain the cabin at $+70°$ F. for about 12 more minutes. At higher or lower speeds, the supply of ram air automatically increases or decreases for a given valve 28 setting, thus increasing or decreasing the amount of cooled air forced into the cabin. As the cabin temperature also increases and decreases with speed, the system for about 20 minutes is substantially self-regulating, and once adjusted requires no attention by the pilot. After 20 minutes the airflow is gradually increased by the pilot to 9 pounds per minute for the remaining 12 minute period.

The cooling system herein described is simple, compact and highly efficient in rapidly abstracting heat from the ram air, as can be seen from the reduction of an entrance air temperature of about 175° F. to a cabin inlet air temperature of $-70°$ F. The use of such a low cabin inlet temperature reduces the necessity of large cooling airflows and thus still further reduces the weight of the cooling system due to the small duct sizes required in that system.

The use of a pourable refrigerant eliminates the necessity of providing large openings in the wing or fuselage of the airplane and in the heat exchanger itself, as the refrigerant is easily charged through a small pipe. The liquid used is completely non-inflammable and non-explosive, yet serves as an excellent heat conductor. As all of the $CO_2$ ice is preferably totally immersed in the liquid, the heat absorbing power of the $CO_2$ vapor is efficiently utilized. In this respect, the $CO_2$ ice particles sink in the liquid and thus the vapor at all times must pass through the liquid.

In common with many other chlorine compounds, trichlorethylene is slightly toxic when absorbed by the human body. Consequently, normal care should be exercised in handling this material to prevent absorption thereof.

What is claimed is:

In combination with an airplane cabin having a cooling air inlet and an air outlet, a cabin cooling system consisting of a ram air inlet in the leading edge of a wing of said airplane, a duct inside of said wing leading from said ram air inlet to said cabin cooling air inlet, a heat exchanger in said duct having walls defining a central refrigerant receiving space, said walls having external fins thereon exposed to the air passing through said duct, a filler tube of relatively small diameter as compared to the dimensions of said refrigerant receiving space extending upwardly to open at the upper surface of said wing, a valve in said duct between said ram air inlet and said heat exchanger, manual valve operating means extending from said cabin to said valve, a stationary charge of refrigerant in said refrigeration space consisting of a soupy mixture of $CO_2$ ice granules and just enough trichlorethylene to cover said granules, said granules being sized so that said mixture can be poured at about $-110°$ F. through said filler tube into said refrigerant space from outside said airplane, and a $CO_2$ gas outlet for said refrigeration space, circulation of air cooled by said refrigerant charge through said cabin being caused solely by ram air pressure developed by said airplane in flight.

LOYAL A. WILLIAMSON, JR.
JOE LEMUEL BYRNE.

REFERENCES CITED

The following references are of record in the file of this patent:

UNITED STATES PATENTS

| Number | Name | Date |
| --- | --- | --- |
| 2,024,027 | Cotton et al. | Dec. 10, 1935 |
| 2,063,477 | Young et al. | Dec. 8, 1936 |
| 2,162,538 | Peo | June 13, 1939 |
| 2,163,996 | Flosdorf | June 27, 1939 |
| 2,318,834 | Birkigt | May 11, 1943 |
| 2,378,815 | Wikoff | June 19, 1945 |
| 2,398,655 | Mayer | Apr. 16, 1946 |